Figure 1:
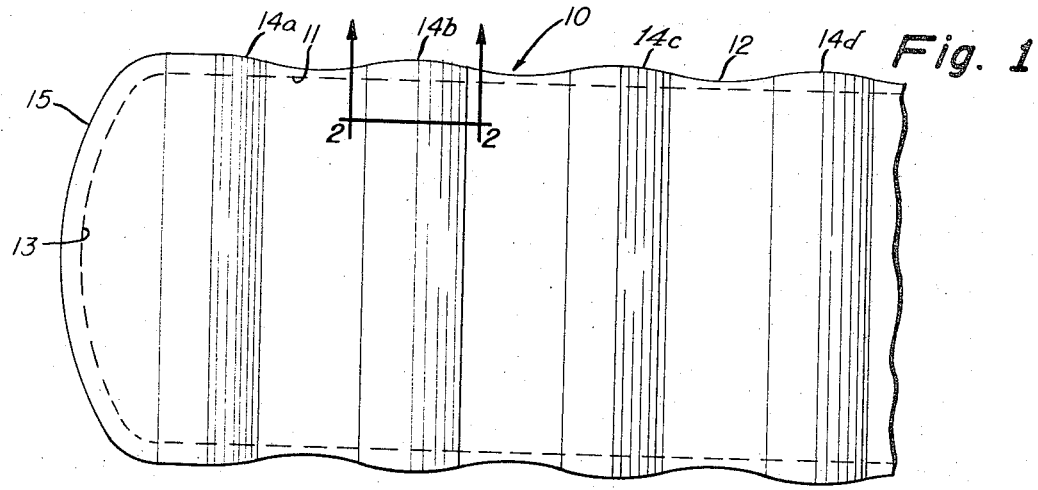

Aug. 15, 1967  R. H. ANDERSON  3,335,903

PLASTIC TANKS

Filed Feb. 28, 1964

INVENTOR.
Robert H. Anderson
BY
Edwin C. Lehner
ATTORNEY

United States Patent Office 3,335,903
Patented Aug. 15, 1967

3,335,903
PLASTIC TANKS
Robert H. Anderson, Elmhurst, Ill., assignor to Standard Oil Company, Chicago, Ill., a corporation of Indiana
Filed Feb. 28, 1964, Ser. No. 348,244
3 Claims. (Cl. 220—83)

This invention relates to storage tanks. More particularly, it relates to glass fiber reinforced plastic tanks especially adaptable for underground storage of liquid hydrocarbons and to a method of preparation thereof.

The petroleum industry conventionally uses metal tanks for the underground storage of liquid hydrocarbons, such as gasoline and fuel oil, especially at service stations. It is well known that the service life of such tanks is extremely variable depending upon the environment in which the tanks are buried. In some locations the service life of a steel tank is sometimes less than one year, even though these tanks have a wall thickness of ¾6″–¼″, due to extremely corrosive environment; whereas in other locations the life of the tank may be as much as 30 years. Frequent replacement of metal tanks is required when used in highly corrosive soils or environments. Thus, large economic losses accrue both from the loss of the tank itself and from the costs incurred in its replacement. Many techniques have been suggested for protecting underground metal storage tanks against corrosion, such as use of anodic "decoy" material and other cathodic protection techniques or by painting or coating with protective materials. However, such techniques have proven unsatisfactory for protecting metal tanks against corrosion. Thus, there is a critical need in the industry for a suitable nonmetallic storage tank that can be effectively used for the underground storage of liquid hydrocarbons at atmospheric pressure.

Non-pressurized storage tanks constructed from non-metallic materials must be capable of withstanding the internal and external forces which are placed upon the tank in normal use. Underground service station tanks are normally buried under the driveways and covered with about 30 inches of earth. In some locations, high water table conditions exist so that the tanks must be provided with hold-down means, which conditions impose extreme forces resulting from up-lift and hold-down. In addition, such buried tanks are subjected to periodic vehicle axle loads that may range from 15–20,000 pounds, and the non-metallic tank must be capable of withstanding such periodic loads without damage or deformation. A suitable non-metallic tank for such purposes must have all of the desirable characteristics and qualifications of metal tanks, as well as being chemically inert to the contents and to the environment in which it is placed. Further, the capacity of the non-metallic storage tanks should be equivalent to the capacity of the metal tanks which normally ranges from 500 to 10,00 gallons.

An object of the invention is to provide a non-metallic storage tank suitable for storage of liquids at atmospheric pressure. A further object of the invention is to provide a glass fiber reinforced plastic tank suitable for the underground storage of gasoline and fuel oil. A still further object of the invention is to provide a method for making a strong, rigid, hollow tank of novel construction, which is fluid-tight and not subject to corrosion.

In accordance with the present invention, a non-metallic horizontal storage tank especially suitable for the underground storage of liquid hydrocarbons is provided by a shell consisting of glass fiber reinforced plastic having an elongated tubular center portion and curved ends defining a substantially closed hollow structure. The tubular center portion of said shell is structurally reinforced against deformation by outwardly projecting circumferential reinforcing rib means integrally formed in the shell. The reinforcing rib means can be either a continuous rib in the form of a helix or a plurality of individual rigs spaced at intervals along the longitudinal axis of the tubular portion.

Figure 4:
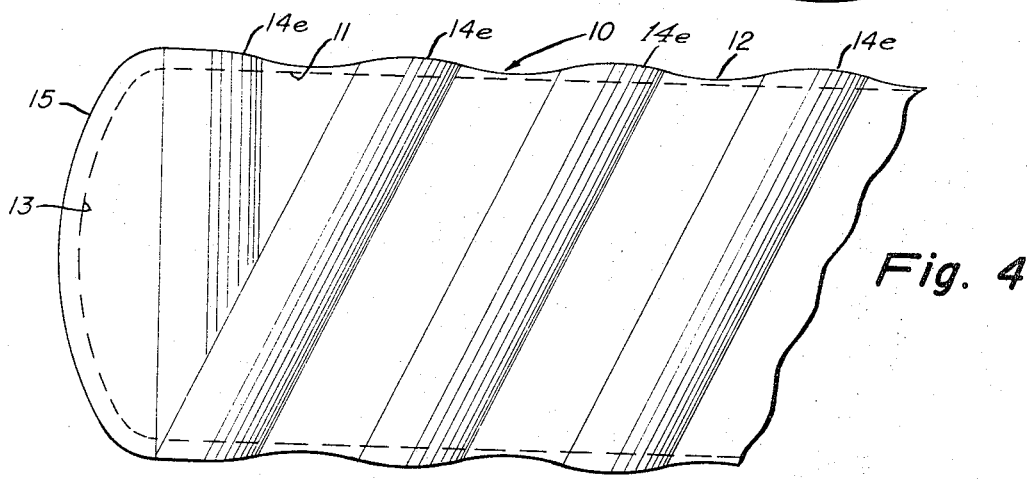
Figure 2:
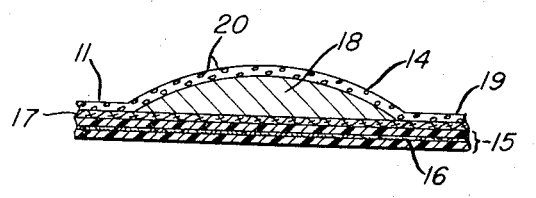
Figure 3:
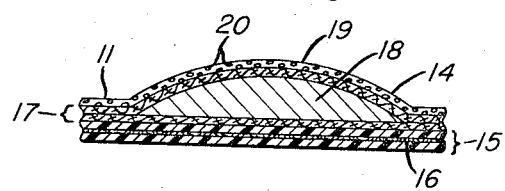

For a more complete understanding of the present invention, reference is made to the accompanying drawings where like reference numerals refer to like parts throughout the views, in which: FIG. 1 is a side view of one end of the tank; FIG. 2 is a cross-sectional view on an enlarged scale taken at line 2—2 of FIG. 1 illustrating shell and integral reinforcing rib construction; FIG. 3 illustrates an alternative embodiment of rib construction; and FIG. 4 is a side view of one end of a tank provided with a continuous helical reinforcing rib.

Referring to FIG. 1, 10 designates the illustrated portion of a non-metallic tank of the invention consisting of shell 11 of glass fiber reinforced plastic having a tubular center portion 12 and outwardly curved end portion 13. Outwardly projecting circumferential reinforcing ribs 14a, 14b, 14c, and 14d are spaced in parallel relationship along the longitudinal axis of said tubular portion 12 to provide said tubular portion with rigidity and strength against deformation. The end of the tank is preferably constructed as a sandwich to provide protection for end portion 13 of shell 11 against damage during transport and installation. The sandwich comprises the end portion 13 of shell 11 as the inner skin and an outer skin 15 of glass fiber reinforced plastic which is spaced therefrom and attached at its peripheral edges to the rib 14a adjacent the curved end. The space between the skins is preferably filled with relatively low structural strength core material, such as foamed polystyrene or urethane. The ends can be curved inwardly or outwardly and be dished or hemispherical in form.

The term "glass fiber reinforced plastic" as used herein and in the claims refers to the solid plastic produced by the curing of a thermosetting resin containing embedded therein a plurality of layers of glass fibers essentially oriented in planes parallel to the shell surfaces.

Shell 11, illustrated in FIG. 2, comprises an inner resin-rich layer portion 15 containing a thin layer of glass-fiber mat 16, an intermediate portion 17 of resin impregnated woven glass cloth, rib forming means 18, and outer portion 19 consisting of resin and a plurality of glass-filament windings 20, layer 19 containing sufficient resin to provide an outer resin-surface.

The composition of shell 11, illustrated in FIG. 3, comprises an inner resin-rich layer portion 15 containing a thin layer of glass-fiber mat 16; an intermediate portion 17 of resin-impregnated woven glass cloth, rib forming means 18, and a plurality of layers of chopped glass fibers essentially oriented in planes parallel to the shell surface; and outer portion 19 consisting of resin and a plurality of glass-filament windings 20.

FIGURES 2 and 3 illustrate that the integral circumferential reinforcing rib means 14a, 14b, 14c, and 14d can be formed in shell 11 during fabrication of the shell by varying the position of rib forming means 18 in the plurality of layers of glass fibers in the intermediate portion of the shell prior to formation of the outer layer of continuous glass-filament windings.

An alternative embodiment of the tank of the invention is shown in FIG. 4. In this embodiment, all elements of the tank are the same as in FIGURES 1–3, except that the reinforcing rib means 14e is continuous in the form of a helix along the length of the tubular portion 12 of shell 11.

The glass fiber reinforced plastic forming tank shell 11 is preferably composed of about 25–50% glass fiber reinforcing material embedded in about 50–75% thermoset resin. Conventional thermosetting resins known to the art can be used, such as epoxy, phenolic, or unsaturated polyester resins. The preferred thermosetting resin is a polymerizable mixture of about 55–65 parts of unsaturated isophthalic acid polyester resin and about 35–45 parts of styrene. The preferred polyester resin is prepared conventionally from 1 mole isophthalic acid, 1 mole of maleic anhydride, and 2.2 moles of propylene glycol, and has an acid number of less than 15 and a hydroxyl number less than 30. Catalytic curing of the thermosetting resin is used to form the thermoset glass fiber reinforced plastic in accordance with conventional curing techniques. The preferred catalyst system for the isophthalic polyester-styrene thermosetting resin is about 0.2% cobalt naphthenate and about 1% methylethyl ketone peroxide. It is to be understood that choice of fabrication technique, glass and thermosetting resin content can be varied broadly and still give the proper chemical inertness and structural strength to the tank.

The tank of the invention can be fabricated by any combination of well-known fabrication techniques used by the plastics industry for the production of glass fiber reinforced plastics. The shell of glass fiber reinforced plastic is preferably formed on a mandrel by laying-up a plurality of layers of polymerizable thermosetting resin and glass reinforcing material, such as woven glass fabric, woven glass roving, woven glass spun roving, or chopped glass, impregnated with the resin until the major portion of the desired shell thickness is obtained. During the fabrication of the shell, outwardly projecting integral circumferential reinforcing rib means are formed by positioning rib forming means in the glass layers. The rib forming means can be of any desired shape, preferably arcuate, of hollow or solid material. Thereafter, the outer portion of the shell is formed by winding a plurality of layers of glass-filaments around the intermediate portion with the windings extending at an angle of between about 5° and 90° with respect to the longitudinal axis of said shell. The filaments can be either a continuous mono-filament or a continuous non-woven tape. After sufficient layers of the glass fibers are deposited along with the thermosetting resin to form the desired thickness in the shell, the thermosetting resin-glass composite is cured to form the solid plastic shell. It is important that the inner and outer surfaces of the shell be substantially pure resin to eliminate possible wicking of liquids along the glass fiber surfaces. Curing can be effected either at room temperature or at elevated temperatures. Improved chemical resistance is obtained when the polymerizable resin-glass composite is cured at elevated temperatures. It is to be understood that the outer resin surface is to be protected against air inhibition during the curing step to obtain satisfactory cure. In order to form a plastic tank having the requisite structural strength and chemical inertness of the size and capacity for underground storage of gasoline and fuel oil in service stations, it is essential that the circumferential reinforcing rib means be integrally formed in the outer portions of the shell so as to provide a tank having a smooth, even and uninterrupted inner surface.

Conventional piping attachment means can be used to provide for the introduction and removal of liquids from the tank.

A plastic tank having a capacity of about 4000 gallons is about 20 feet long and 6 feet in diameter. Parallel integral circumferential reinforcing ribs, having an arcuate cross section located on about 12 inch centers along the tubular portion of the tank and extending approximately 1.5 inches radially outward from the outer surface of the shell, yield a tank having a structural strength essentially equivalent to a steel tank of similar dimensions.

Horizontal plastic tanks made in accordance with this invention are unitary structures substantially free from corrosive attack by environment and contents. The tank has high strength to unit weight and does not require the protective techniques or coating that metal tanks require. Products stored in the plastic tanks are free from contamination by the normal products of corrosion of internal surfaces of metal tanks. Frequent and expensive replacement of metal tanks in service stations located in highly corrosive locations is obviated by the plastic tanks of the invention.

The tanks of this invention can also be used for the storage of other liquids either above or below ground level so long as the liquids do not attack the plastic. For example, the tank can be equipped with cradle-type supports and covered with insulating material for use as above-ground storage of water. Tanks of similar configuration but of smaller capacity can be used for residential storage of fuel oils.

I claim:

1. A container for fluids comprising a glass fiber reinforced closed hollow plastic shell having an elongated tubular portion terminating in a circumferential periphery at each end of said tubular portion and end portions being curved to define said substantially closed hollow shell, said shell comprising a thermosetting isophthalic polyester resin distributed throughout the shell in permeating relationship with a plurality of layers of reinforcing glass fibers shaped to the form of said tubular portion and said curved end portions and included in said resin, the outer portion of said layers consisting of helically-wound glass filament forming a helical pattern, said filament extending at an angle of between about 5° and 90° with respect to the longitudinal axis of said shell, said tubular portion including a plurality of integrally formed reinforcing ribs, said ribs disposed outwardly from the exterior of said shell in spaced relationship along the longitudinal axis of said tubular portions, said curved ends including a sandwich with an inner layer consisting of said shell, an outer layer consisting of a thermosetting isophthalic polyester glass fiber-reinforced plastic laminate spaced from said inner layer to accommodate a core of material, said core of material being of relatively low structural strength and laminated between said inner layer and said outer layer to fill said space and form said core, said outer layer joined at said periphery to said reinforcing ribs adjacent the curved ends.

2. The container structure of claim 1 wherein said ends are curved inwardly to form dish shaped surfaces and said space between said inner layer and said outer layer being filled with a core of foamed poly-styrene, and said reinforcing ribs with solid arcuate cross section in spaced relationship integrally formed about said tubular portion in substantially circumferential relationship.

3. The container structure of claim 1 wherein said ends are curved outwardly to form substantially hemispherical surfaces and said space between said inner layer and said outer layer being filled with a core of foamed urethane, said integrally formed reinforcing ribs with hollow arcuate cross section being wound about said tubular portion of said container in a helical relationship.

References Cited

UNITED STATES PATENTS

| | | |
|---|---|---|
| 36,175 | 8/1862 | Seely. |
| 2,373,270 | 4/1945 | Skolnik. |
| 2,614,058 | 10/1952 | Francis. |
| 2,744,043 | 5/1956 | Ramberg. |
| 2,983,403 | 5/1961 | Mauser _____ 220—71 X |
| 2,995,011 | 8/1961 | Kimmel. |

THERON E. CONDON, *Primary Examiner.*

GEORGE E. LOWRANCE, *Examiner.*